Patented Apr. 6, 1943

2,315,708

UNITED STATES PATENT OFFICE 2,315,708

POLYESTER RESINS FROM PHTHALIC ANHYDRIDE PENTAERYTHRITOL AND SOYA BEAN OIL

Almon G. Hovey, Birmingham, and Theodore S. Hodgins and Charles J. Meeske, Royal Oak, Mich., assignors to Reichhold Chemicals, Inc., Detroit, Mich.

No Drawing. Application January 15, 1941, Serial No. 374,558

2 Claims. (Cl. 260—22)

This invention relates to compositions of matter produced from phthalic anhydride, pentaerythritol, and soya bean oil, and to the process of producing the same, and to its use in air-drying and baking enamels.

Burke and Hopkins, U. S. Patent 1,667,189 (April 24, 1928), describe compositions of matter produced from polybasic acids, pentaerythritol, and fatty acids of drying oils; our product differs from theirs in that it is formed directly from soya oil and is a different composition of matter having markedly different properties. We are also cognizant of the fact that other monobasic unsaturated acids than those of drying oils have been esterified by pentaerythritol as, for example, the L. N. Bent, U. S. Patent 2,066,759 (January 5, 1937), and the disclosure of A. A. Tikhomirov, Lakokrasochnuyu Ind. Za, 1935, No. 3, pp. 27–8, in which the formation of ester gum was also described.

We are also cognizant of the fact that "alcoholysis" of oils is also a known procedure in the preparation of alkyd resins, that process usually consisting of heating the oil with a molecular equivalent of glycerol at temperatures substantially about 240° C., using litharge, or sodium hydroxide, or other alkaline catalysts which split the oil and form mono- and di-glycerides of the oil. According to the preferred embodiment of the present invention we proceed to split the oil using as small an amount as possible of pentaerythritol with the oil to form alcohol-soluble intermediates which are presumably somewhat heterogeneous in their composition, but, for convenience, they may be called, for want of a better name, "pentaerythritides." There are, however, certain difficulties connected with the alcoholysis of drying oils by pentaerythritol in the presence of the catalyst which are not encountered in the preformance of a corresponding process by the use of glycerol or of ethylene glycol with oils.

It has been known for some time, as stated by Burke and Hopkins, that resins made from pentaerythritol, phthalic anhydride, and fatty acids have good hardness, faster drying, and better print-resistance than are obtainable with the corresponding glycerol resin. Generally, however, there is too much speed in the reaction for controllable commercial large scale production of such items. Furthermore, the relatively high cost of pentaerythritol seems to have limited seriously the industrial adaptation of the resins described by Burke and Hopkins. Not only has the cost of pentaerythritol itself been very high, but also, it was necessary to use fatty acids which cost considerably more than oils. We have found a relatively low cost product which uses oils and which has better hardness than the corresponding glycerol-phthalic anhydride-drying oil resins and which has better drying speed and hardness and superior water-resistance.

There are several peculiarities which manifest themselves when trying to carry out an alcoholysis using pentaerythritol. First, the hydroxyl groups of pentaerythritol differ from those of glycerol and of the glycols in the fact that they really are not merely hydroxyl groups, but that they are methylol groups and are subject to reaction with other molecules of pentaerythritol independent of their reaction with phthalic anhydride and/or other dibasic acids. Without discoursing further on the possibilities and mechanisms of reactions, of pentaerythritol with itself inasmuch as there appears to be considerable in the literature concerning this subject, let us proceed to other peculiarities of this process.

The second point is that during alcoholysis, a lower temperature must be maintained than is customary, using glycerol and oil. A temperature of 190–220° C. is best for good results in performing alcoholysis to obtain a good alcohol-soluble intermediate in from ¾ of an hour to 3 hours. If a higher temperature is maintained, there seems to be considerable possibility of reaction of the pentaerythritol with itself in preference to reaction with the oil.

Thirdly, in the final preparation of the resin while using straight pentaerythritol, the reduction of acid number to a value of less than 50, which is a characteristic of the present product, is generally difficult and, therefore, it is necessary to use much more than theoretical proportions of pentaerythritol with respect to the polybasic and monobasic acids. This is probably due to the loss of hydroxyl groups due to self reaction, but when using the oil and attempting to obtain a low acid number of the final product, there is an additional saving in pentaerythritol over the theoretical amount. We are aware that a process for using drying oils and China-wood oils with pentaerythritol and phthalic anhydride has been described by Robinson, U. S. Patent No. 2,123,206 dated July 12, 1938. The fact that Robinson apparently had no difficulty in obtaining an acid number as low as 7 for his product is probably due to the extremely low amount of phthalic acid employed with respect to the total composition.

Fourth point, when using oil and glycerol, the interchange reaction involves only oil and glycerol. When using oils and pentaerythritol, the interchange reaction does not involve merely oil and pentaerythritol; it involves also the glycerol of the oil and the pentaerythritol which ties on to the split oil. We have found that among the catalysts one that is very efficient is substantially 0.5 part of litharge per 1000 parts by weight of drying oil.

The advantages of products prepared from phthalic anhydride, pentaerythritol, and soya oil as compared to products prepared from phthalic anhydride, glycerine, and soya oil are much better hardness, better waterproofness, faster drying speed, better abrasion resistance, greater freedom from tackiness and quicker print-resistance. As compared, on the other hand, to products made from phthalic anhydride, pentaerythritol, and the corresponding fatty acids, there is, of course, the very obvious advantage of economy both from the use of soya oil instead of soya fatty acids and for the greatly diminished amount of pentaerythritol required for the production of low acid number final condensation products. Furthermore, the reaction is slower and, therefore, much safer in the reaction kettle. While these products, in general, do not dry quite so fast or hard as the ones made from phthalic anhydride, pentaerythritol, and soya fatty acids on account of the glycerol component of the oil itself, nevertheless, they are so much superior to the resins from phthalic anhydride, glycerol and soya oil that with the economy feature, they are very desirable products to market. In general, this process makes the "softer" oils such as soya dry with speed, hardness, and waterproofness approaching that of wood oil varnishes, and in that way, the products can be regarded as eliminating wood oil which is imported and fluctuates violently in price, depending on conditions in the Orient. In fact, when a "hard" oil such as tung is employed, the resulting alkyd cooks very fast and often dries so hard that the resulting film becomes brittle.

The hexahydric alcohols sorbitol and manitol do not produce satisfactory results as compared to pentaerythritol, as there seems to be degradation as evidenced by development of dark color. Furthermore, alkyds produced with these hexahydric alcohols do not have fast air-drying properties.

Products produced according to the specific examples which follow illustrate the three types of highly desirable, marketable products:

1. Long oil, brushing alkyd vehicles which are superior in hardness and in retention of color and gloss.

2. Fast air-drying, spraying alkyds of the short oil type, the drying of which approaches that of lacquer, but with the durability of the unmodified pure alkyd.

3. Quick converting, oily printing ink vehicles.

The following examples serve as illustrations of our invention of using pentaerythritol together with soya oil and subsequently reacting the intermediate alcohol-soluble product with phthalic anhydride to form alkyd resins of superior drying quality.

The preferred process accordingly comprises producing a resinous product from soya bean oil, pentaerythritol and phthalic anhydride by first heating the oil to about 180° C., adding a small quantity of an alcoholysis producing alkaline catalyst and a quantity of pentaerythritol just sufficient to effect substantially complete alcoholysis of the oil, maintaining the batch at a temperature of about 190° to 220° C. for a period of three-quarters of an hour to three hours until alcoholysis is substantially complete and an alcohol soluble intermediate is obtained, then adding additional pentaerythritol and phthalic anhydride at a temperature of about 200° C. in a quantity sufficient to form a resinous product, and continuing the reaction at a temperature of about 220° to 250° C. until a final resinous product is obtained having an acid number of less than 50.

*Example 1*

|  | Pounds | Per cent |
| --- | --- | --- |
| Alkali refined soya bean oil | 732 | 53.9 |
| Litharge | 0.39 |  |
| Pentaerythritol | 106 | 14.7 |
|  | 94 |  |
| Phthalic anhydride | 426 | 31.4 |
| Total | 1358.39 | 100.0 |

The oil is heated to 180° C., then the litharge added at that temperature and heating carried on up to 240° C. At this point, the first amount of pentaerythritol may be added, the effect being to reduce the temperature to about 220° C. The oil and pentaerythritol are then heated in the presence of the litharge for ¾–1½ hours until a sample shows that the reaction mixture is now completely soluble in alcohol, showing that the alcoholysis is completed. The additional 94 lbs. of pentaerythritol are now added to chill the batch down to approximately 200° C. at which point the phthalic anhydride is introduced. The division of the pentaerythritol is for three purposes: First, using only as much as is necessary for alcoholysis to prevent the tendency for self-reaction; secondly, the less pentaerythritol present, the less foaming; and thirdly, excess pentaerythritol at any one time tends to exist for a certain length of time as a sludge in the bottom of the kettle which, physically, interferes with the agitator blades. After the introduction of the phthalic anhydride, the batch is heated to 220° C. until a viscosity, on the Gardner-Holdt scale, of approximately L—N is obtained in a 50% solution in mineral spirits (boiling range, 300–400° F., kauri butanol No. approximately 32), or until a hot plate cure of 7–8 seconds at 200° C. is obtained for thin films. The acid number of the solution at 50% is approximately 14, and the color (Hellige-Klett scale) is less than 1. The viscosity of a 60% solution in mineral spirits is about $Z_4$—$Z_8$ (Gardner-Holdt).

The resulting resin solution, upon addition of driers, such as 0.05% cobalt and 0.05% manganese on the solid resin content, when cast in films on glass at 0.004 inch, dries slowly in the initial stages but, overnight, retains a hardness comparable to long oil phenol-modified alkyd resins and to medium length wood oil spar varnishes. The viscosity is too high for "sagging" or "curtains" and is low enough so that the brush marks flow out and level well. Maintenance of viscosity when driers are added is far superior to any corresponding resins made from phthalic anhydride, pentaerythritol, and fatty acids, and also, in comparison, this material does not skin over, whereas the fatty acid type skins over very rapidly and soon gels after the driers are added. Since this product does not set up immediately, but remains oily and free from tack, it brushes out well and enables "lapping over" for quite some time, at least an hour, after the material is first brushed out. Overnight, it has a Sward hardness of 20 to 25 which is extremely hard, especially for the class of house paint. The scratch hardness for abrasion-resistance is of the order of magnitude of the medium length wood oil spar varnishes or of oil-modified phenol-modified alkyds. But, since this material is exclusively a soya oil product, it has extremely light color and excellent color retention which is unattainable when wood oil or phenol modification is employed. Brushed out, air-dried films of enamels made with this vehicle on wood level out and appear to be as hard as spray films on metal which have been baked. Sward hardness, after 68 hours, of the corresponding straight soya oil-glycerine-phthalic anhydride alkyd is about 6–12, whereas films of this vehicle have a Sward hardness of 26–30 after 68 hours.

*Example 2*

|  | Pounds | Per cent |
| --- | --- | --- |
| Alkali refined soya bean oil | 630 | 40.5 |
| Litharge | 0.35 |  |
| Pentaerythritol | 240 | 15.4 |
| Phthalic anhydride | 546 | 35.1 |
| Pentaerythritol | 140 | 9.0 |
|  | 1556.35 | 100.0 |

The oil is heated to 180° C., the litharge added at that temperature, and heating carried on up to 230° C. at which time the first addition of 240 lbs. of pentaerythritol is added, and the temperature thereafter maintained at 220° C. until the resulting product is completely soluble in alcohol, 4 volumes of alcohol to 1 of resinous intermediate.

At 200° C., the 546 lbs. of phthalic anhydride are added and the batch reheated to 200° C. as quickly as is expedient with reaction and foaming, and then the remaining 140 lbs. of pentaerythritol are added at 200° C. after approximately 15 minutes at that temperature. The resin becomes clear almost as soon as the pentaerythritol is melted, and this usually occurs about 5 minutes after regaining 190° C. The temperature is then allowed to rise to 220° C. at which point it is maintained for approximately 1½ hours, the resin becoming very stiff and free from tack when cooled and having approximately a 17 second cure on a 200° C. hot plate when spread out in a thin film. The resulting light colored resin, when thinned to 50% non-volatile content in toluol, has a Gardner-Holdt viscosity of R—S, and acid No. of 19–20 on solution, a color (Hellige-Klett) of 2L. This resin solution is miscible with raw linseed oil in a wide range of proportions. When driers such as 0.06% cobalt and 0.06% manganese, in the form of the naphthenate driers, are added on a non-volatile resin basis, the resulting films, when cast at 0.004 inch, become dust-free in approximately 10 minutes and tack-free in approximately 4 hours, and overnight, attain a Sward hardness of 20 to 30, depending on the drying conditions. These films are free from wrinkling when applied in thick films on metal and even free from wrinkling when they are partially dried or set and then suddenly exposed to 150° F. which would be the equivalent of driving a newly refinished automobile from a shady spot out into the intensely hot summer sunlight. Under such conditions, they are also shower-proof. On account of the remarkably fast drying properties and hardness which enables painting overnight and because of their freedom from other modification than oils, with resultant excellent exterior durability, these resins are admirably adapted for automotive refinishing by spray gun application in garages all over the country. The hardness which is attained in a very short time by air drying approaches the hardness of baked enamels. The hardness of enamels made from this phthalic anhydride-pentaerythritol-drying oil resin, while it does not approach the hardness of a corresponding phthalic anhydride-pentaethritol-fatty acid resin, nevertheless, is very much harder than that of a corresponding phthalic anhydride-glycerine-soyabean oil resin, and also has much less reactivity with pigment than does the phthalic anhydride-pentaerythritol-fatty acid resin.

*Example 3*

|  | Pounds | Per cent |
| --- | --- | --- |
| Alkali refined soya bean oil | 876 | 62.4 |
| Litharge | 0.47 |  |
| Pentaerythritol | 196 | 13.9 |
| Phthalic anhydride | 330 | 23.7 |
| Total | 1402.47 | 100.0 |

The oil was heated under inert gas to 180° C. at which point the litharge was added and taken on up to 220° C. at which point 130 lbs. of the pentaerythritol are added. After about 1 hour of refluxing at 220° C., the resulting interaction intermediate product becomes completely soluble in denatured alcohol whereupon the remaining 66 pounds of pentaerythritol may be used as a chillback to cool the batch to approximately 200° C. At 200° C., approximately 15 minutes after the second addition of pentaerythritol, the phthalic anhydride may be added. Heating is resumed until 220° C. is reached whereupon the temperature may be maintained at that point 2–3 hours until the resin has advanced to a hot plate cure at 200° C. in thin films of 15 seconds. The oily resinous mass, at this stage, is still quite soft and oily and so soluble in mineral spirits that it has a viscosity of less than A (Gardner-Holdt). The solid resin has a medium high viscosity somewhere between Z and $Z_4$ (Gardner-Holdt). Due to the long oil length, this resin may be advanced still further by advancing the temperature to 230–245° C. without danger of loss of the batch, but with a tendency towards darkening. The resin may be advanced to a stage where it has a consistency like a thick petroleum jelly rather than of oily nature. The resin at intermediate stages of high viscosity, however, possesses very little initial tendency towards tackiness even when driers are added under conditions approximating those of printing. The oily nature and freedom from tackiness at room temperature together with the quick attainment of the same ultimate hardness of film, attained upon long periods of drying, by elevation of temperature or use of infra-red lamps, makes this material seem very promising as a printing ink vehicle. This material is also very miscible with drying oils in practically all proportions. Due to its ease of brushability, it also makes an interesting house paint vehicle. The acid number of this product may be reduced by further reaction as low as 3–6 on the non-volatile resin content when at a viscosity of $Z-Z_4$.

The following example, while not falling within the scope of the present invention, is set forth by way of comparison between a process using soya bean oil, phthalic anhydride and pentaerythritol and one in which linseed oil is used to replace the soya oil:

Example 4

Same formula as Example 2 except that alkali refined linseed oil replaces the soya oil. The resinous product resulting was somewhat darker in color, but when a 16-second cure at 200° C. hot plate in thin films was reached, the product had a viscosity of $Z_3$-$Z_5$ (Gardner-Holdt), an acid number of 16.2 (solution), and a color of 3 (Hellige-Klett). This resin, when compared by air-drying against Example 2, was not so fast in air-drying although it would be expected that a linseed oil resin would dry faster than a corresponding soya oil resin. The viscosity, however, was already so high that interruption of the reaction was necessary in order to still obtain a usable product at a comparative non-volatile content, i. e., 50%. Lengthening out the cooking time still further increases the drying properties of this resin, but due to the higher viscosity, the nonvolatile content has to be less than 50% in order to have a solution of usable viscosity. Nevertheless, this example shows that Example 2, using the soya bean oil, can be made to accomplish the faster drying formerly associated with wood oil varnishes or alkyds.

The following formula is an example of a fast drying architectural enamel which possesses excellent brushing properties together with color retention, gloss retention, and exterior durability:

| | Pounds |
|---|---|
| Titanated lithopone | 567 |
| Sublimed litharge | 3 |
| Solid resin as described in Example 1 | 368 |
| Mineral spirits | 368 |
| Pine oil | 15 |
| Turpentine | 5 |
| 24% lead naphthenate drier | 8 |
| 6% cobalt naththenate drier | 1½ |
| 6% manganese naphthenate drier | 2 |

This enamel was prepared by 2 passes on 3 roller mill after a short premix. The vehicle possesses excellent wetting and grinding characteristics, a third pass through the mill not being necessary in order to equal the commercial enamel which does have 3 passes.

This enamel brushes out well, covers well, and levels out without "sagging" or showing brush marks. It has equal gloss to a corresponding enamel made from ¾ of a soya bean oil-glycerine-phthalic anhydride resin and ¼ of a phenolic modified wood oil alkyd, said enamel being a very successful commercial enamel of this type. The enamel made according to this example has far superior color and color retention and equal gloss, whereas the overnight hardness is considerably higher than that of the commercial enamel.

Gloss retention, i. e., freedom from development of haze, constitutes an improvement over the phthalic-glycerol-soya oil vehicle.

A black, fast air-drying, automotive, refinishing, synthetic enamel was prepared using the vehicle described in Example 2 by means of a pebble mill grind:

| | Pounds |
|---|---|
| Neospectra Black (Binney & Smith, New York) | 45 |
| Prussian Blue No. 4035 (R. C. I.) | 10 |
| Pine oil | 20 |
| Union oil #30 (high solvency type petroleum naphtha) | 60 |
| Xylol | 250 |
| 6% cobalt naphthenate (Nuodex) drier | 7 |
| 6% Manganese naphthenate (Nuodex) drier | 7 |

The pigments were "prewet" ½ hour by grinding the above ingredients in the mill and then these were added to 150 lbs. of the 50% solution described in Example 2. After 72 hours grind, 1320 lbs. of the vehicle (50% solution) from Example 2 were added together with 120 lbs. of xylol. The resulting glossy, black, hard enamel when sprayed on automotive steel was free from dust in 5 minutes or about as fast as a nitrocellulose lacquer. The next morning, it had a Sward Hardness of 30 compared with 24 for one of the best known popular commercial enamels for this purpose and yet, at the same time, possessed freedom from wrinkling, showerproofness, ability to be taped without sticking. Such hardness and resistance to abuse apparently, heretofore, has not been obtainable without the application of heat.

We claim:

1. A process of producing a resinous product from soya bean oil, pentaerythritol and phthalic anhydride, which comprises heating the oil to about 180° C., adding a small quantity of an alcoholysis producing alkaline catalyst and a quantity of pentaerythritol just sufficient to effect substantially complete alcoholysis of the oil, maintaining the batch at a temperature of about 190° to 220° C. for a period of three-quarters of an hour to three hours until alcoholysis is substantially complete and an alcohol soluble intermediate is obtained, then adding additional pentaerythritol and phthalic anhydride at a temperature of about 200° C. in a quantity sufficient to form a resinous product, and continuing the reaction at a temperature of about 220° to 250° C. until a final resinous product is obtained having an acid number of less than 50.

2. A resinous product produced from soya bean oil, pentaerythritol and phthalic anhydride according to the process of claim 1.

ALMON G. HOVEY.
THEODORE S. HODGINS.
CHARLES J. MEESKE.